UNITED STATES PATENT OFFICE.

CARL STRAUB, OF SYRACUSE, NEW YORK, ASSIGNOR TO THE ADAMANT MANUFACTURING COMPANY, OF SAME PLACE.

COMPOSITION OF BUILDING MATERIAL FOR ARCHITECTURAL PURPOSES.

SPECIFICATION forming part of Letters Patent No. 392,528, dated November 6, 1888.

Application filed June 13, 1888. Serial No. 276,971. (No specimens.)

*To all whom it may concern:*

Be it known that I, CARL STRAUB, of Syracuse, in the county of Onondaga, in the State of New York, have invented new and useful Improvements in Composition of Building Materials for Architectural Purposes, of which the following is a full, clear, and exact description.

This invention consists, chiefly, in mixing with any mineral cement for architectural purposes, chiefly for plastering walls, a certain proportion of magnesia, (carbonate of magnesia calcined, or silicate of magnesia,) or in the form of steatite, talc, or mica. The addition of the magnesia to the cement or mortar renders the latter more easily treated by the trowel and produces a very smooth and glossy surface. It may be added to any of the compounds described in either of my prior patents, No. 353,896, dated December 7, 1886, and No. 361,601, dated April 19, 1887, and to a greater or less extent in my pending applications for patents, Serial No. 265,305, filed February 25, 1888, and Serial No. 266,447, filed March 7, 1888. However, I prefer to mix the magnesia or its aforesaid chemical equivalents with the following composition of matter and in the manner hereinafter specified, viz:

Glue or gelatinous matter of either vegetable or animal source is dissolved in water, and to about eight pounds of this is added about sixteen pounds of oil or fat or saccharine matter or any hydrocarbon compound or its acids or salts. After the aforesaid ingredients have been thorougly mixed, about twenty-two pounds of muriatic acid and about five pounds of sulphuric acid are added, and then the mixture is heated to about 450° and thoroughly mixed by stirring. It is then allowed to cool and to stand about three days, during which time it is occasionally stirred. At the end of this period about sixteen and a half parts of water are added to one part of the mixture, and then the following material is sifted into it and thoroughly mixed, said material consisting of one part of calcined sulphate of lime to about one-twentieth part of calcined carbonate of lime, and this compound is allowed to stand until dry. If it is desired to impart any particular color to the compound, the dry coloring-matter is added to the lime before sifting it into the liquid compound.

The magnesia or its hereinbefore-mentioned chemical equivalents may be mixed with either of the aforesaid dry compounds or cements in the proportion of about one-fifth of the former to four-fifths of the dry compound.

What I claim is—

The improved composition of matter for architectural purposes, consisting of magnesia mixed with dissolved glue or gelatinous matter, hydrocarbon compound, acid, and pulverized calcined material, as set forth.

In testimony whereof I have hereunto signed my name, in the presence of two witnesses, at Syracuse, in the county of Onondaga, in the State of New York, this 11th day of June, 1888.

CARL STRAUB. [L. S.]

Witnesses:
 MARK W. DEWEY,
 C. L. BENDIXON.